United States Patent [19]

Broemer et al.

[11] 3,877,953

[45] Apr. 15, 1975

[54] NIOBIUM PENTOXIDE-CONTAINING BOROSILICATE GLASSES

[75] Inventors: Heinz Broemer, Hermannstein; Norbert Meinert, Wetzlar, both of Germany

[73] Assignee: Ernst Leitz GmbH. Optische Werke, Wetzlar, Germany

[22] Filed: Nov. 27, 1972

[21] Appl. No.: 309,804

[52] U.S. Cl. .................... 106/54; 106/53; 106/47 Q
[51] Int. Cl. .............................................. C03c 3/08
[58] Field of Search ........................... 106/54, 47 Q

[56] References Cited
UNITED STATES PATENTS

| | | | |
|---|---|---|---|
| 2,576,521 | 11/1951 | Kreidl | 106/54 |
| 3,460,954 | 8/1969 | Young | 106/54 |
| 3,503,764 | 3/1970 | Young | 106/54 |
| 3,716,385 | 2/1973 | Ritze | 106/54 X |

*Primary Examiner*—Winston A. Douglas
*Assistant Examiner*—John F. Niebling
*Attorney, Agent, or Firm*—Erich M. H. Radde

[57] ABSTRACT

Niobium pentoxide-containing borosilicate glasses having a medium to high index of refraction, a relatively high dispersion, and a high chemical resistance, consist of 30 % to 42 %, by weight, of the glass-forming components silicon dioxide and boron trioxide, the silicon dioxide content thereof being between 22 % and 30 %, by weight, and the boron trioxide content thereof being between 8 % and 14 %, by weight, 2 % to 53 %, by weight, of niobium pentoxide, and 9 % to 22 %, by weight, of potassium oxide.

These glasses may additionally contain other metal oxides of fluorides in predetermined amounts.

22 Claims, No Drawings

NIOBIUM PENTOXIDE-CONTAINING BOROSILICATE GLASSES

BACKGROUND OF THE INVENTION

1. Field Of The Invention

The present invention relates to borosilicate glasses and more particularly to borosilicate glasses containing niobium pentoxide, said glasses having improved properties, and to a process of producing same.

2. Description Of The Prior Art

Glass for optical purposes which is obtained by melting batches of mixtures consisting of silicon dioxide, boron trioxide, and alkali metal oxides are not only known but have also been thoroughly investigated in technical and scientific respect for a long time. Such glass batch mixtures, as is known, can easily be melted down and yield optical glasses which are substantially free of striae or schlieren and bubbles without particular technical expenditure.

The disadvantage of these known optical glasses resides essentially in the fact that they are relatively readily attacked by the atmosphere. Therefore, attempts have been made to further modify the composition of such glasses by adding thereto oxides of elements of the second and third groups of the periodic system, and particularly by adding thereto calcium oxide and a larger or smaller amount of aluminum oxide. The hydrolytic type of the glasses was improved somewhat by the addition of these oxides.

Furthermore, glasses of similar optical properties are known, namely glasses of the "heavy flint" type which consist essentially of silicon dioxide and lead monoxide or of silicon dioxide, lead monoxide, and lanthanum oxide. However, such glasses and especially those with a higher content of lead monoxide have the disadvantage that they are, in general, rather sensitive to staining. Therefore, considerable difficulties in the large-scale manufacture of lenses are encountered.

SUMMARY OF THE INVENTION

It is one object of the present invention to provide optical glasses having medium to high indices of refraction and relatively high dispersion which glasses are substantially free of the disadvantages of the known optical glasses and which have a high chemical resistance, are substantially colorless, and can readily be further processed into blanks and molded bodies.

Another object of the present invention is to provide a simple and effective process of producing such valuable optical glasses.

Other objects and advantageous features of the present invention will become apparent as the description proceeds.

In principle these objects of the present invention are achieved by providing a glass which consists to about 30 % to 42 %, by weight, of the glass-forming components silicon dioxide $SiO_2$ and boron trioxide $B_2O_3$. In such glass compositions the silicon dioxide content must be between about 22 % and about 30 %, by weight, and the boron trioxide content between about 8 % and about 14 %, by weight. In addition thereto these glass compositions contain between about 2 % and about 53 %, by weight, of niobium pentoxide and between about 9 % and about 22 %, by weight, of potassium oxide.

According to an advantageous embodiment of the present invention the mixtures of components from which the glasses are produced by melting, can additionally contain up to 38 %, by weight, of an oxide selected from an element consisting of lithium, sodium, magnesium calcium, strontium, barium, zinc, cadmium, lead, aluminum, indium, lanthanum, tantalum, antimony, bismuth, tellurium, and titanium; or, respectively, up to 30 %, by weight, of a fluoride selected from the fluorides of elements consisting of lithium, sodium, magnesium, calcium, strontium, barium, lead, and aluminum.

According to another embodiment of the present invention there can be added, in place of the fluoride, an alkali metal-hydrogen fluoride or a complex alkali metal-hexafluoro titanate.

Glass compositions according to the present invention have the further advantage that the starting batch mixtures can be melted very readily and at a relatively low temperature, that the glasses can be produced substantially free of schlieren and bubbles, and that the optical properties of the resulting glasses meet substantially all the present day requirements of the optical designer, so that a wide range of use in the manufacture of optical instruments is afforded.

DESCRIPTION OF THE PREFERRED EMBODIMENTS

The following examples serve to illustrate the present invention without, however, limiting the same thereto. The attached Tables illustrate the composition of useful glasses according to the present invention. In these Tables the amounts of the various components are given in per cent by weight.

In Table I there are set forth glass compositions which consist exclusively of the four main components silicon dioxide $SiO_2$, boron trioxide $B_2O_3$, potassium oxide $K_2O$, and niobium pentoxide $Nb_2O_5$. The actual glass-forming components ($SiO_2 + B_2O_3$) are present in an amount between about 30 % and about 42 %, by weight. The proportion of these glass-forming components is in the lower part of the indicated range when a high index of refraction is desired.

TABLE I

| Example | 1 | 2 | 3 | 4 | 5 | 6 |
|---|---|---|---|---|---|---|
| $SiO_2$ | 30.0 | 28.5 | 28.5 | 25.9 | 23.5 | 22.4 |
| $B_2O_3$ | 11.0 | 13.5 | 10.5 | 9.5 | 8.6 | 8.2 |
| $K_2O$ | 22.0 | 21.0 | 21.0 | 19.0 | 17.2 | 16.4 |
| $Nb_2O_5$ | 37.0 | 37.0 | 40.0 | 45.6 | 50.7 | 53.0 |
| $n_e$ | 1.6748 | 1.6868 | 1.7068 | 1.7590 | 1.7775 | 1.7942 |
| $\nu_e$ | 30.3 | 31.5 | 29.6 | 26.3 | 25.5 | 24.4 |

Table I, furthermore, shows that a decrease of the potassium oxide content yields a glass of a higher index of refraction and that an increase of the niobium pentoxide content yields also a glass of a higher index of refraction. Surprisingly it was found that the glasses produced by melting such mixture are colorless as well as low in schlieren and bubbles even when they have a high content of niobium pentoxide $Nb_2O_5$.

Table II shows that in addition to potassium oxide $K_2O$, lithium oxide $Li_2O$ or sodium oxide $Na_2O$ can also be used.

TABLE II

| Example: | 3 | 7 | 8 | 9 |
|---|---|---|---|---|
| $SiO_2$ | 28.5 | 28.5 | 28.5 | 24.7 |
| $B_2O_3$ | 10.5 | 10.5 | 10.5 | 9.0 |
| $K_2O$ | 21.0 | 21.0 | 21.0 | 9.0 |
| $Nb_2O_5$ | 40.0 | 20.0 | 30.0 | 48.2 |
| $Li_2O$ | — | — | — | 9.1 |
| $Na_2O$ | — | 20.0 | 10.0 | — |
| $n_e$ | 1.7068 | 1.6020 | 1.6617 | 1.7609 |
| $\nu_e$ | 29.6 | 40.9 | 35.5 | 30.0 |

Partial replacement of niobium pentoxide $Nb_2O_5$ by tantalum pentoxide $Ta_2O_5$ produces a glass which is very similar in its chemical properties and in those properties pertaining to glass technology. This is shown in Table III. Thereby, the amounts of the two glasforming components and the alkali metal oxide were not varied. It is evident from Table III that the index of refraction decreases with an increase in the tantalum pentoxide content $Ta_2O_5$ which replaces the proportionally decreasing niobium pentoxide $Nb_2O_5$ content.

TABLE III

| Example: | 10 | 11 | 12 | 13 |
|---|---|---|---|---|
| $SiO_2$ | 28.5 | 28.5 | 28.5 | 28.5 |
| $B_2O_3$ | 10.5 | 10.5 | 10.5 | 10.5 |
| $K_2O$ | 21.0 | 21.0 | 21.0 | 21.0 |
| $Nb_2O_5$ | 30.0 | 20.0 | 10.0 | 2.0 |
| $Ta_2O_5$ | 10.0 | 20.0 | 30.0 | 38.0 |
| $n_e$ | 1.6874 | 1.6733 | 1.6535 | 1.6429 |
| $\nu_e$ | 32.4 | 34.3 | 37.4 | 39.7 |

Table IV shows the use of trivalent and tetravalent metal oxides and the variations in the indices of refraction Ne and the Abbe values ($\nu_e$) obtained thereby.

In this case also, with the exception of the melts of Example 23, the amounts of the glass-forming components and of the alkali metal oxides were not varied so as to clearly show the possibilities of modifying the optical properties as a function of the addition of said trivalent and tetravalent metal oxides.

Examples 20 to 24 show that with an increasing content of titanium dioxide $TiO_2$, the index of refraction and the dispersion of the glasses increase greatly. These glasses, despite their high titanium dioxide content, are surprisingly little colored and relatively stable. As a result thereof they are of considerable interest to the optical designer.

In place of titanium dioxide, titanium can also be included in the mixture in the form of other compounds, particularly in the mixture in complex form as alkali metal hexafluorotitanate, for instance, as potassium hexafluorotitanate $K_2TiF_6$.

Table V shows the effect of the replacement of niobium pentoxide by potassium hexafluorotitanate. In the examples given in Table V the amounts of the three main components (silicon dioxide $SiO_2$, boron trioxide $B_2O_3$, and potassium oxide $K_2O$) were not varied. Only

TABLE V

| Example | 3 | 25 | 26 | 27 | 28 | 29 | 30 |
|---|---|---|---|---|---|---|---|
| $SiO_2$ | 28.5 | 28.5 | 28.5 | 28.5 | 28.5 | 28.5 | 28.5 |
| $B_2O_3$ | 10.5 | 10.5 | 10.5 | 10.5 | 10.5 | 10.5 | 10.5 |
| $K_2O$ | 21.0 | 21.0 | 21.0 | 21.0 | 21.0 | 21.0 | 21.0 |
| $Nb_2O_5$ | 40.0 | 10.0 | 15.0 | 20.0 | 25.0 | 30.0 | 35.0 |
| $K_2TiF_6$ | — | 30.0 | 25.0 | 20.0 | 15.0 | 10.0 | 5.0 |
| $n_e$ | 1.7068 | 1.5922 | 1.6195 | 1.6307 | 1.6562 | 1.6708 | 1.6804 |
| $\nu_e$ | 29.6 | 39.0 | 36.3 | 35.4 | 33.3 | 32.2 | 31.9 | the amounts of niobium pentoxide $Nb_2O_5$ and of potassium tetrafluorotitanate $K_2TiF_6$ were systematically varied, whereby the sum of $Nb_2O_5$ and $K_2TiF_6$ always equals 40 %, by weight.

In accordance with a further embodiment of the present invention, fluorides of elements selected from the group consisting of lithium, sodium, magnesium, calcium, strontium, barium, lead, and aluminum as well as potassium bifluoride $KHF_2$ can partially replace niobium pentoxide $Nb_2O_5$ while the amounts of the three other glass-forming components of the glass compositions, namely silicon dioxide, boron trioxide, and potassium oxide are not varied. Examples of such glass compositions are given in Table VI. It is evident that even a relatively small amount of niobium pentoxide in the glass composition is sufficient to produce glasses of a good hydrolytic type.

TABLE IV

| Example | 14 | 15 | 16 | 17 | 18 | 19 | 20 | 21 | 22 | 23 | 24 |
|---|---|---|---|---|---|---|---|---|---|---|---|
| $SiO_2$ | 28.5 | 28.5 | 28.5 | 28.5 | 28.5 | 28.5 | 28.5 | 28.5 | 28.5 | 28.5 | 28.5 |
| $B_2O_3$ | 10.5 | 10.5 | 10.5 | 10.5 | 10.5 | 10.5 | 10.5 | 10.5 | 10.5 | 13.5 | 10.5 |
| $K_2O$ | 21.0 | 21.0 | 21.0 | 21.0 | 21.0 | 21.0 | 21.0 | 21.0 | 21.0 | 21.0 | 21.0 |
| $Nb_2O_5$ | 30.0 | 20.0 | 10.0 | 30.0 | 30.0 | 20.0 | 30.0 | 20.0 | 10.0 | 2.0 | 5.0 |
| $Sb_2O_3$ | 10.0 | 20.0 | 30.0 | — | — | — | — | — | — | — | — |
| $BiO_3$ | — | — | — | 10.0 | — | — | — | — | — | — | — |
| $TeO_2$ | — | — | — | — | 10.0 | 20.0 | — | — | — | — | — |
| $TiO_2$ | — | — | — | — | — | — | 10.0 | 20.0 | 30.0 | 35.0 | 35.0 |
| $n_e$ | 1.6867 | 1.6938 | 1.6331 | 1.6829 | 1.6359 | 1.6590 | 1.7131 | 1.7302 | 1.7443 | 1.7472 | 1.7656 |
| $\nu_e$ | 32.3 | 31.2 | 33.7 | 32.7 | 37.7 | 35.3 | 28.5 | 26.5 | 24.6 | 24.4 | 23.5 |

TABLE VI

| Example | 31 | 32 | 33 | 34 | 35 | 36 | 37 | 38 | 39 | 40 |
|---|---|---|---|---|---|---|---|---|---|---|
| $SiO_2$ | 28.5 | 28.5 | 28.5 | 28.5 | 28.5 | 28.5 | 28.5 | 28.5 | 28.5 | 28.5 |
| $B_2O_3$ | 10.5 | 10.5 | 10.5 | 10.5 | 10.5 | 10.5 | 10.5 | 10.5 | 10.5 | 10.5 |
| $K_2O$ | 21.0 | 21.0 | 21.0 | 21.0 | 21.0 | 21.0 | 21.0 | 21.0 | 21.0 | 21.0 |
| $Nb_2O_5$ | 30.0 | 30.0 | 30.0 | 20.0 | 30.0 | 30.0 | 20.0 | 30.0 | 20.0 | 10.0 |
| LiF | 10.0 | — | — | — | — | — | — | — | — | — |
| NaF | — | 10.0 | — | — | — | — | — | — | — | — |
| $KHF_2$ | — | — | — | — | — | — | — | — | — | — |
| $MgF_2$ | — | — | 10.0 | 20.0 | — | — | — | — | — | — |
| $CaF_2$ | — | — | — | — | 10.0 | — | — | — | — | — |
| $SrF_2$ | — | — | — | — | — | 10.0 | 20.0 | — | — | — |
| $BaF_2$ | — | — | — | — | — | — | — | 10.0 | 20.0 | 30.0 |
| $PbF_2$ | — | — | — | — | — | — | — | — | — | — |
| $AlF_3$ | — | — | — | — | — | — | — | — | — | — |
| $n_e$ | 1.6657 | 1.6386 | 1.6382 | 1.6127 | 1.6551 | 1.6626 | 1.6268 | 1.6642 | 1.6380 | 1.6066 |
| $\nu_e$ | 35.7 | 37.3 | 36.2 | 41.1 | 36.8 | 36.3 | 41.9 | 36.4 | 41.2 | 48.2 |

| Example: | 41 | 42 | 43 | 44 | 45 | 46 | 47 |
|---|---|---|---|---|---|---|---|
| $SiO_2$ | 28.5 | 28.5 | 28.5 | 28.5 | 28.5 | 28.5 | 28.5 |
| $B_2O_3$ | 10.5 | 10.5 | 10.5 | 10.5 | 10.5 | 10.5 | 10.5 |
| $K_2O$ | 21.0 | 21.0 | 21.0 | 21.0 | 21.0 | 21.0 | 21.0 |
| $Nb_2O_5$ | 30.0 | 30.0 | 20.0 | 10.0 | 30.0 | 20.0 | 10.0 |
| LiF | — | — | — | — | — | — | — |
| NaF | — | — | — | — | — | — | — |
| $KHF_2$ | — | 10.0 | 20.0 | 30.0 | — | — | — |
| $MgF_2$ | — | — | — | — | — | — | — |
| $CaF_2$ | — | — | — | — | — | — | — |
| $SrF_2$ | — | — | — | — | — | — | — |
| $BaF_2$ | — | — | — | — | — | — | — |
| $PbF_2$ | — | — | — | — | 10.0 | 20.0 | 30.0 |
| $AlF_3$ | 10.0 | — | — | — | — | — | — |
| $n_e$ | 1.6234 | 1.6442 | 1.5874 | 1.5410 | 1.6760 | 1.6617 | 1.6298 |
| $\nu_e$ | 34.5 | 36.1 | 43.3 | 49.9 | 32.9 | 34.5 | 37.1 |

A valuable aid in establishing desired optical values -without impairing the stability and resistance of the glass- is afforded by the partial replacement of niobium pentoxide $Nb_2O_5$ by an oxide of the elements magnesium, calcium, strontium, barium, zinc, cadmium, and lead. These oxides are added in an amount up to about 30 %, by weight. On exceeding said limit, especially when using lead monoxide PbO to replace niobium pentoxide $Nb_2O_5$, the glasses produced by melting such compositions, become softer. Table VII gives a number of examples of compositions of this type.

TABLE VIII

| Example | 61 | 62 | 63 | 64 | 65 |
|---|---|---|---|---|---|
| $SiO_2$ | 28.5 | 28.5 | 28.5 | 28.5 | 28.5 |
| $B_2O_3$ | 10.5 | 10.5 | 10.5 | 10.5 | 10.5 |
| $K_2O$ | 21.0 | 21.0 | 21.0 | 21.0 | 21.0 |
| $Nb_2O_5$ | 30.0 | 30.0 | 10.0 | 30.0 | 10.0 |
| $Al_2O_3$ | 10.0 | — | — | — | — |
| $In_2O_3$ | — | 10.0 | 30.0 | — | — |
| $La_2O_3$ | — | — | — | 10.0 | 30.0 |
| $n_e$ | 1.6665 | 1.6661 | 1.6231 | 1.6808 | 1.6487 |
| $\nu_e$ | 34.3 | 34.2 | 42.1 | 35.3 | 44.5 |

TABLE VII

| Ex. | 48 | 49 | 50 | 51 | 52 | 53 | 54 | 55 | 56 | 57 | 58 | 59 | 60 |
|---|---|---|---|---|---|---|---|---|---|---|---|---|---|
| $SiO_2$ | 28.5 | 28.5 | 28.5 | 28.5 | 28.5 | 28.5 | 28.5 | 28.5 | 28.5 | 28.5 | 28.5 | 28.5 | 28.5 |
| $B_2O_3$ | 10.5 | 10.5 | 10.5 | 10.5 | 10.5 | 10.5 | 10.5 | 10.5 | 10.5 | 10.5 | 10.5 | 10.5 | 10.5 |
| $K_2O$ | 21.0 | 21.0 | 21.0 | 21.0 | 21.0 | 21.0 | 21.0 | 21.0 | 21.0 | 21.0 | 21.0 | 21.0 | 21.0 |
| $Nb_2O_5$ | 30.0 | 30.0 | 10.0 | 30.0 | 10.0 | 30.0 | 10.0 | 30.0 | 10.0 | 30.0 | 10.0 | 30.0 | 10.0 |
| MgO | 10.0 | — | — | — | — | — | — | — | — | — | — | — | — |
| CaO | — | 10.0 | 30.0 | — | — | — | — | — | — | — | — | — | — |
| SrO | — | — | — | 10.0 | 30.0 | — | — | — | — | — | — | — | — |
| BaO | — | — | — | — | — | 10.0 | 30.0 | — | — | — | — | — | — |
| ZnO | — | — | — | — | — | — | — | 10.0 | 30.0 | — | — | — | — |
| CdO | — | — | — | — | — | — | — | — | — | 10.0 | 30.0 | — | — |
| PbO | — | — | — | — | — | — | — | — | — | — | — | 10.0 | 30.0 |
| $n_e$ | 1.6518 | 1.6835 | 1.6507 | 1.6744 | 1.6209 | 1.6785 | 1.6259 | 1.6755 | 1.6200 | 1.6771 | 1.6300 | 1.6877 | 1.6675 |
| $\nu_e$ | 36.5 | 36.3 | 46.7 | 36.1 | 47.3 | 35.8 | 46.8 | 34.0 | 43.5 | 34.3 | 41.3 | 32.1 | 33.5 |

Trivalent metal oxides can also be used successfully in glass batch compositions in accordance with the present invention. Table VIII gives examples of such glass compositions in which part of the niobium pentoxide has been replaced by aluminum oxide $Al_2O_3$, indium oxide $In_2O_3$, or lanthanum oxide $La_2O_3$.

From the foregoing examples it is observed that the index of refraction ($n_e$) for the glass compositions of the present invention ranges between a value of 1.5410 and 1.7942, whereas the Abbe value ($n_e$) for the composition ranges between 23.5 ($\nu_{and}$ 49.9. It is observed that all of the compositions in accordance with the invention contain between 30 and 42 weight percent of the glass forming components $SiO_2$ and $B_2O_3$ and between 9 and 22 weight percent of $K_2O$; however, when the compositions contain $Nb_2O_5$ as the only additional component, the $Nb_2O_5$ is present within the range of 37 to 53 weight percent as illustrated in Table I. On the other hand, when part of the $Nb_2O_5$ is replaced with a metal oxide or a fluorine containing compound, the compositions contain between 37 and 58 weight percent of the combined $Nb_2O_5$ and additional compound, which in turn is observed to constitute between 2 and about 48 weight percent of $Nb_2O_5$ with the balance being made up by one of the additional components. The permissible amounts of additional components may be summarized as follows:

Up to 10 weight percent of an oxide of the elements Li, Mg, Al, and Bi;
up to 20 weight percent of an oxide of the elements Na and Te;
up to 30 weight percent of an oxide of the elements Ca, Sr, Ba, Zn, Cd, Pb, In, La, and Sb;
up to 35 weight percent $TiO_2$;
up to 38 weight percent $Ta_2O_5$;
up to 10 weight percent of a fluoride of the elements Li, Na, Ca, and Al;
up to 20 weight percent of a fluoride of the elements Mg and Sr;
up to 30 weight percent of a fluoride of the elements Ba and Pb;
up to 30 weight percent $KHF_2$; and
up to 30 weight percent $K_2TiF_6$.

The glass according to the present invention is preferably produced by melting compositions as given in the attached Tables in platinum vessels at a temperature between about 1,200° C. and about 1,300° C. After melting down the starting batch, fining and homogenizing is effected at 1400°C., whereupon the melt is cooled to pouring temperature. Pouring and casting are then carried out in the conventional manner.

As stated hereinabove, the glasses according to the present invention have improved chemical and physical properties. Due to these improved properties the range of application of said glasses is very considerably increased. Thus they can be used as external or front lenses in optical systems of all kinds, for instance, of binoculars, objectives of cameras and microscopes, prism systems, and in general for all optical systems of high value in which an optical glass of the advantageous and specific properties of the glasses according to the present invention is required.

Especially noteworthy is the low susceptibility of the glasses according to the present invention against staining or spotting as determined by allowing a standard acetate solution of the pH-value of 4.6 and/or a sodium acetate buffer solution of the pH-value of 5.6 to act upon the plane-polished surface of the glass to be tested. Thereby, interference color spots are produced more or less rapidly due to decomposition of the glass surface.

The hydrolytic properties of the glasses of the present invention such as resistance against the changes in climate, i.e. changes in the atmospheric humidity and temperature, and their weathering resistance are also considerably improved.

We claim:

1. A niobium pentoxide-containing borosilicate glass composition having an index of refraction ($n_e$) between 1.5410 and 1.7942, an Abbe value ($\nu_e$) of between 23.5 and 49.9 and being characterized by a high degree of chemical resistance, consisting essentially of A. from about 30% to about 42% by weight of the combined glass-forming oxides $SiO_2$ and $B_2O_3$, wherein the $SiO_2$ content of said combined amount comprises between about 22% and about 30% by weight and the $B_2O_3$ content of said combined amount comprises between about 8% and about 14% by weight;

B. between about 9% and about 22% by weight of $K_2O$;

C. and a component selected from the group consisting of i.) between about 37% and about 53% by weight of $Nb_2O_5$ and ii.) from about 37% to about 58% by weight of a combination of $Nb_2O_5$ and a further component, wherein the $Nb_2O_5$ content in said combined amount comprises between about 2% and about 48% by weight and said additional component in combination with the $Nb_2O_5$ is selected from the group consisting of a. an amount of an oxide of the element Li, Mg, Al or Bi, said amount not substantially exceeding about 10% by weight.

b. an amount of an oxide of the element Na or Te, said amount not substantially exceeding about 20% by weight;

c. an amount of an oxide of the element Ca, Sr, Ba, Zn, Cd, Pb, In, La or Sb, said amount not substantially exceeding about 30% by weight;

d. an amount of $TiO_2$, said amount not substantially exceeding about 35% by weight;

e. an amount of $Ta_2O_5$, said amount not substantially exceeding about 38% by weight;

f. an amount of a fluoride of the element Li, Na, Ca or Al, said amount not substantially exceeding about 10% by weight;

g. an amount of a fluoride of the element Mg or Sr, said amount not substantially exceeding about 20% by weight;

h. an amount of a fluoride of the element Ba or Pb, said amount not substantially exceeding about 30% by weight;

i. an amount of $KHF_2$, said amount not substantially exceeding about 30% by weight; and j. an amount of $K_2TiF_6$, said amount not substantially exceeding about 30% by weight.

2. The glass composition as defined by claim 1 wherein C. is the component consisting essentially of from about 37% to about 53% by weight of $Nb_2O_5$.

3. The glass composition as defined by claim 1, wherein C. is the component consisting essentially of from about 37% to about 58% by weight of the combination of $Nb_2O_5$ and an additional component.

4. The glass composition as defined by claim 3, wherein said additional component is lithium oxide.

5. The glass composition as defined by claim 3, wherein said additional component is sodium oxide.

6. The glass composition as defined by claim 3, wherein said additional component is magnesium oxide.

7. The glass composition as defined by claim 3, wherein said additional component is zinc oxide.

8. The glass composition as defined by claim 3, wherein said additional component is cadmium oxide.

9. The glass composition as defined by claim 3, wherein said additional component is lead monoxide.

10. The glass composition as defined by claim 3, wherein said additional component is bismuth trioxide.

11. The glass composition as defined by claim 3, wherein said additional component is aluminum oxide.

12. The glass composition as defined by claim 3, wherein said additional component is titanium dioxide.

13. The glass composition as defined by claim 3, wherein said additional component is tellurium dioxide.

14. The glass composition as defined by claim 3, wherein said additional component is tantalum pentoxide.

15. The glass composition as defined by claim 3, wherein said additional component is lithium fluoride.

16. The glass composition as defined by claim 3, wherein said additional component is sodium fluoride.

17. The glass composition as defined by claim 3, wherein said additional component is magnesium fluoride.

18. The glass composition as defined by claim 3, wherein said additional component is calcium fluoride.

19. The glass composition as defined by claim 3, wherein said additional component is strontium fluoride.

20. The glass composition as defined by claim 3, wherein said additional component is lead fluoride.

21. The glass composition as defined by claim 3, wherein said additional component is aluminum fluoride.

22. The glass composition as defined by claim 3, wherein said additional component is potassium hexafluoro titanate.

* * * * *

UNITED STATES PATENT AND TRADEMARK OFFICE
CERTIFICATE OF CORRECTION

PATENT NO. : 3,877,953
DATED : April 15, 1975
INVENTOR(S) : HEINZ BROEMER and NORBERT MEINERT It is certified that error appears in the above-identified patent and that said Letters Patent are hereby corrected as shown below:

After "[21] Appl. No.: 309,804" the following insertion should be made:

-- [30] Foreign Application Priority Data
December 2, 1971  Germany P 21 59 759.1 --.

Last line of ABSTRACT: "of" should read -- or --.

Column 4, line 2: "Ne" should read -- $n_e$ --.

Table IV, column of "Example": "$BiO_3$" should read -- $Bi_2O_3$ --.

Table VI, column of "Example": "$BeF_2$" should read -- $BaF_2$ --.

Table VIII, column of "Example": "$Pn_2O_3$" should read -- $In_2O_3$ --; and "$B_2C_3$" should read -- $B_2O_3$ --.

Column 6, lines 65-66 should read: "whereas the Abbe value ($\nu_e$) for the composition ranges between 23.5 and 49.9."

Signed and Sealed this nineteenth Day of August 1975

[SEAL]

Attest:

RUTH C. MASON
Attesting Officer

C. MARSHALL DANN
Commissioner of Patents and Trademarks